(12) United States Patent
Prasad et al.

(10) Patent No.: US 11,268,914 B2
(45) Date of Patent: Mar. 8, 2022

(54) SUPER-STAGES AND METHODS OF CONFIGURING SUPER-STAGES FOR FRACTURING DOWNHOLE EARTH FORMATIONS

(71) Applicants: Umesh Prasad, Spring, TX (US); Sergey Stolyarov, Tomball, TX (US); David Gadzhimirzaev, Houston, TX (US); Robert Samuel Hurt, Tomball, TX (US); Eduardo Adrian Cazeneuve, Spring, TX (US); Frank Walles, The Woodlands, TX (US); Geoffrey Cave, Houston, TX (US); Said D. Sadykhov, Sugar Land, TX (US)

(72) Inventors: Umesh Prasad, Spring, TX (US); Sergey Stolyarov, Tomball, TX (US); David Gadzhimirzaev, Houston, TX (US); Robert Samuel Hurt, Tomball, TX (US); Eduardo Adrian Cazeneuve, Spring, TX (US); Frank Walles, The Woodlands, TX (US); Geoffrey Cave, Houston, TX (US); Said D. Sadykhov, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 340 days.

(21) Appl. No.: 15/405,379

(22) Filed: Jan. 13, 2017

(65) Prior Publication Data
US 2018/0202263 A1  Jul. 19, 2018

(51) Int. Cl.
*G01N 23/00* (2006.01)
*E21B 43/26* (2006.01)
*E21B 43/267* (2006.01)

(52) U.S. Cl.
CPC ............. *G01N 23/00* (2013.01); *E21B 43/26* (2013.01); *E21B 43/267* (2013.01)

(58) Field of Classification Search
CPC ........ G01N 23/00; E21B 43/26; E21B 43/267
(Continued)

(56) References Cited

U.S. PATENT DOCUMENTS

| 4,434,028 A | 2/1984 | Eppig et al. |
| 4,608,859 A | 9/1986 | Rockley et al. |

(Continued)

FOREIGN PATENT DOCUMENTS

| CN | 103122762 | 5/2013 |
| WO | 2016022301 A1 | 2/2016 |

OTHER PUBLICATIONS

Lecampion et al., Can We Engineer Better Multistage Horizontal Completions? Evidence of the Importance of Near-Wellbore Fracture Geometry From Theory, Lab and Field Experiments, Conference: SPE Hydraulic Fracturing Technology Conference (Year: 2015).*

(Continued)

*Primary Examiner* — Toan M Le
*Assistant Examiner* — Xiuqin Sun
(74) *Attorney, Agent, or Firm* — Cantor Colburn LLP

(57) ABSTRACT

Systems, tools, and methods for optimizing fracturing schedules located along a horizontal wellbore include obtaining drilling cuttings during a drilling operation representative of a predetermined interval of the horizontal wellbore, performing at least one analytical process on the obtained drilling cuttings to determine at least one geomechanical property of the interval of the obtained drilling cuttings for the interval, generating a formation analysis estimation for the interval from the, wherein the formation analysis estimation comprises at least one of (i) a brittleness (Continued)

of the formation at the interval or (ii) a minimum horizontal stress of the formation at the interval, and based on the formation analysis estimation, at least one of (i) configuring a super-stage for deployment to the interval to perform a fracturing operation or (ii) designing a fracturing schedule to be performed to frac the formation at the interval.

17 Claims, 6 Drawing Sheets

(58) Field of Classification Search
USPC .............................................................. 702/6
See application file for complete search history.

(56) References Cited

U.S. PATENT DOCUMENTS

| | | | |
|---|---|---|---|
| 7,343,974 | B2 | 3/2008 | Cowan |
| 8,101,907 | B2 | 1/2012 | Jacobi et al. |
| 8,781,762 | B2 | 7/2014 | MacLeod et al. |
| 8,967,249 | B2 | 3/2015 | Akkurt et al. |
| 9,303,508 | B2 | 4/2016 | Ramakrishnan et al. |
| 9,394,779 | B2* | 7/2016 | Nelson .................. E21B 43/267 |
| 2010/0228483 | A1 | 9/2010 | Lecompte |
| 2011/0182144 | A1 | 7/2011 | Gray |
| 2013/0270011 | A1* | 10/2013 | Akkurt .................. E21B 49/088 175/58 |
| 2013/0308831 | A1 | 11/2013 | Dvorkin et al. |
| 2014/0222405 | A1 | 8/2014 | Lecerf et al. |
| 2015/0025863 | A1* | 1/2015 | Walls .................... G01N 33/241 703/2 |
| 2015/0068806 | A1 | 3/2015 | Duran Toro et al. |
| 2015/0122493 | A1 | 5/2015 | Wood et al. |
| 2015/0184507 | A1* | 7/2015 | Stringer .............. E21B 41/0092 73/152.02 |
| 2015/0315894 | A1 | 11/2015 | Guo |
| 2016/0003019 | A1 | 1/2016 | Mohammadreza et al. |
| 2016/0090823 | A1* | 3/2016 | Alzahabi ................ E21B 41/00 703/2 |
| 2016/0123117 | A1 | 5/2016 | Gu et al. |
| 2016/0177709 | A1* | 6/2016 | Li ........................... E21B 49/00 166/249 |
| 2017/0066959 | A1* | 3/2017 | Hull ....................... C09K 8/032 |

OTHER PUBLICATIONS

Song et al., Measurement of minimum horizontal stress from logging and drilling data in unconventional oil and gas (Unpublished master's thesis). University of Calgary, Calgary, AB (Year: 2012).*
Srodon et al., Quantitative X-Ray Diffraction Analysis of Clay-Bearing Rocks From Random Preparations, Clays and Clay Minerals, vol. 49, No. 6, pp. 514-528 (Year: 2001).*
Davis et.al., Wellsite Mineralogical Data Acquisition; Reconciling Results From Multiple Analytical Sources, SPWLA 56th Annual Logging Symposium (Year: 2015).*
Baker Hughes, Inc. "Rockview In-situ mineralogical characterization service", 2010; 7 pages.
Balme et al. "Fracture toughness measurements on igneous rocks using a high-pressure, high-temperature rock fracture mechanics cell", Journal of Volcanology and Geothermal Research, 132(2-3) 2004; pp. 159-172.
International Search Report and Written Opinion, International Application No. PCT/US2018/013504, dated Apr. 25, 2018, Korean Intellectual Property Office; International Search Report 4 pages, International Written Opinion 8 pages.
Iqbal et al. "Experimental Calibration of ISRM Suggested Fracture Toughness Measurement Techniques in Selected Brittle Rocks", Rock Mech. Rock Engng. (2007) 40 (5), 453-475.
Lacy, L.L "Dyanmic Rock Mechanics Testing for Optimized Fracture Designs", SPE 38716, BJ Services Company, USA (1996) 13 pages.
Mavko et al. "The Rock Physics Handbook, Tools for Seismic Analysis of Porous Media", Second Edition, Cambridge University Press (2009) 5 pages.
Schlumberger, "Technical Paper: New Method for Determining Mineralogy and Matrix Properties from Elemental Chemistry Measured by Gamma Ray Spectroscopy Logging Tools", Presented 2014; 2 pages.

* cited by examiner

SUPER-STAGES AND METHODS OF CONFIGURING SUPER-STAGES FOR FRACTURING DOWNHOLE EARTH FORMATIONS

BACKGROUND

1. Field of the Invention

The present invention generally relates to downhole tools and more particularly to super-stages and methods of configuration super-stages for fracturing downhole earth formations.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Horizontal boreholes are typically used for fracing operations to extract material from shales and other earth formations. Typical sections of a horizontal wells are fractured using frac-stages that are configured to output injection fluids to increase pressures within the formation and thus fracture the formation and release the desired materials for extraction. Earth formations are composed of multiple minerals, rocks, geological formations, etc. and thus will respond to fluid pressures and fracturing differently based on the composition thereof. Accordingly, to increase production rates and improve fracturing of the formation, a large number of frac-stages can be deployed downhole. In such arrangements, different frac-stages can be configured to output injection fluids at different rates to fracture the formation. Because of the different injection rates, and the variability of the earth formation, alternating frac-stages of high- and low-injection rates may be deployed to increase the chances of efficient fracturing. However, such increase in frac-stages can be costly and/or still be inefficient for complete formation fracturing. Accordingly, it may be advantageous to develop improved fracturing mechanisms.

SUMMARY

Disclosed herein are systems and methods for optimizing fracturing schedules located along horizontal wellbores. The systems and method, in some embodiments, include obtaining drilling cuttings during a drilling operation representative of a predetermined interval of the horizontal wellbore, performing at least one analytical process on the obtained drilling cuttings to determine at least one geomechanical property of the interval of the obtained drilling cuttings for the interval, generating a formation analysis estimation for the interval from the, wherein the formation analysis estimation comprises at least one of (i) a brittleness of the formation at the interval or (ii) a minimum horizontal stress of the formation at the interval, and based on the formation analysis estimation, at least one of (i) configuring a super-stage for deployment to the interval to perform a fracturing operation or (ii) designing a fracturing schedule to be performed to frac the formation at the interval.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are methods and apparatus for installing and supporting electronics and component packages in downhole tools, particularly within cavities of housings that are configured to contain the electronics. Various embodiments herein are directed to hydraulic frames and support systems that enable easy installation, removable, and secure clamping within the housing. Embodiments described herein are directed to hydraulic systems with master-slave hydraulic assemblies.

Figure 1A:
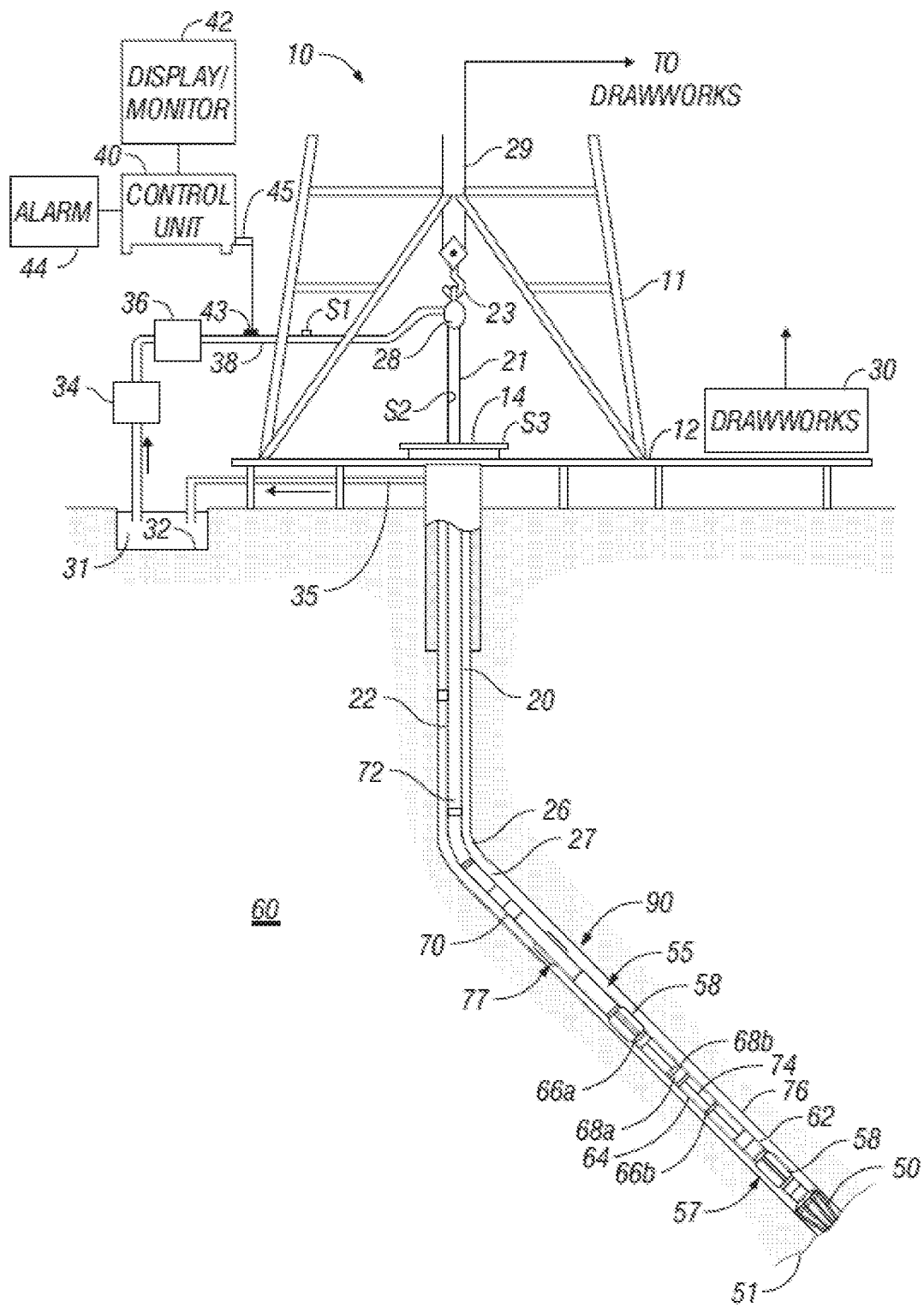
FIG. 1A is an example drilling system that can employ embodiments of the present disclosure.

FIG. 1A shows a schematic diagram of a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to a drawworks 30 via a kelly joint 21, swivel 28 and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1A, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1A, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electro-magnetic telemetry system, a wireless telemetry system that may utilize repeaters in the drill string or the wellbore and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive or resonant coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the wellbore by a suitable injector while the downhole motor, such as mud motor 55, rotates the disintegrating tool 50. For offshore drilling, an offshore rig or a vessel is used to support the drilling equipment, including the drill string.

Still referring to FIG. 1A, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

Figure 1B:
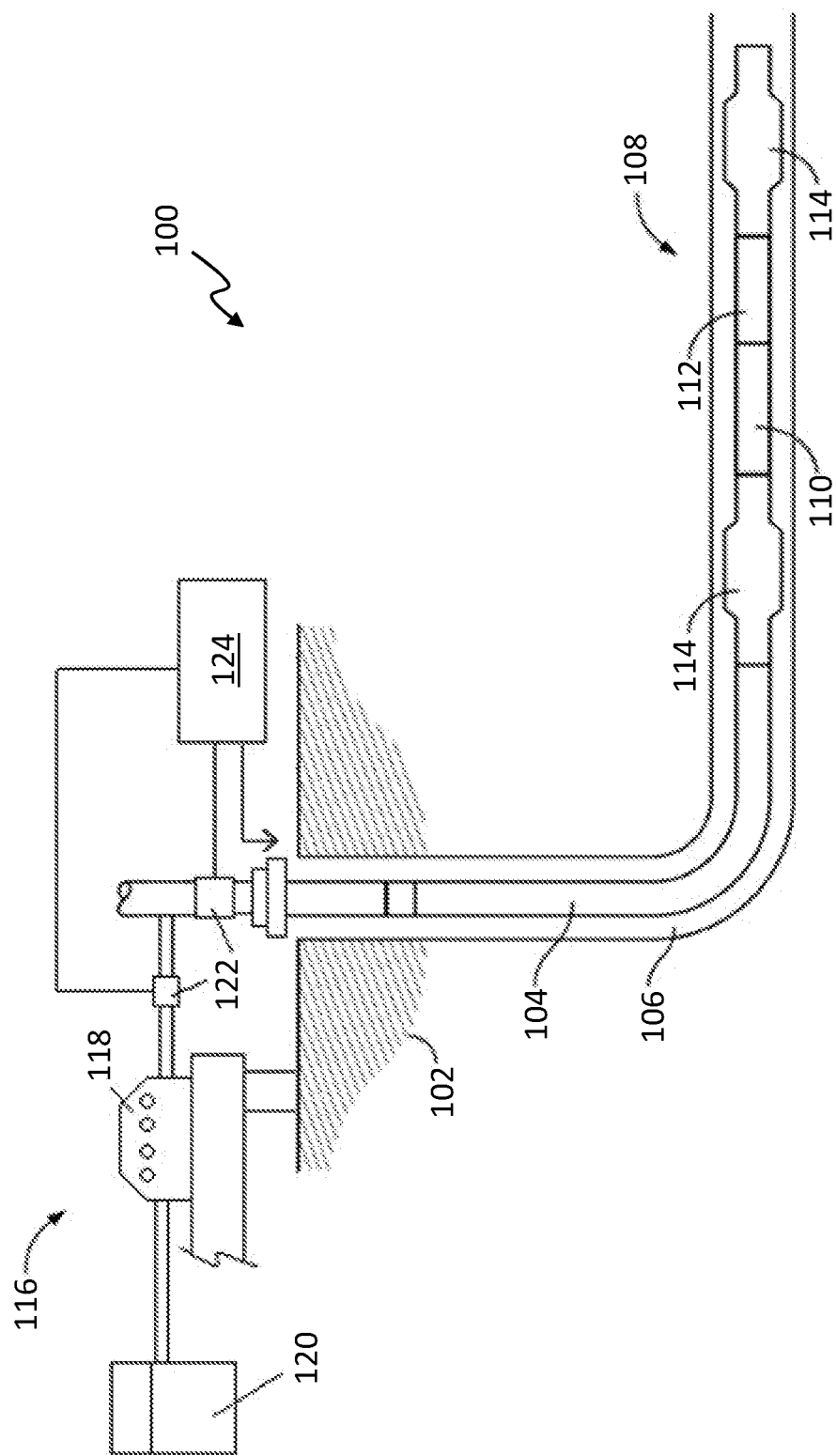
FIG. 1B depicts a system for formation stimulation and hydrocarbon production that can incorporate embodiments of the present disclosure.

Turning now to FIG. 1B, a schematic illustration of an embodiment of a system 100 for hydrocarbon production and/or evaluation of an earth formation 102 that can employ embodiments of the present disclosure is shown. The system 100 includes a borehole string 104 disposed within a borehole 106. The string 104, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 100 is configured as a hydraulic stimulation system. As described herein, "stimulation" may include any injection of a fluid into a formation, e.g., proppant. A fluid may be any flowable substance such as a liquid, a gas, or a flowable solid such as sand (e.g., proppant). In such embodiment, the string 104 includes a downhole assembly 108 that includes one or more tools or components to facilitate stimulation of the formation 102. For example, the string 104 includes a fluid assembly 110, such as a fracture or "frac" sleeve device or an electrical submersible pumping system, and a perforation assembly 112. Examples of the perforation assembly 112 include shaped charges, torches, projectiles, and other devices for perforating a borehole wall and/or casing. The string 104 may also include additional components, such as one or more isolation or packer subs 114.

One or more of the downhole assembly 108, the fracturing assembly 110, the perforation assembly 112, and/or the packer subs 114 may include suitable electronics or processors configured to communicate with a surface processing unit and/or control the respective tool or assembly. A surface system 116 can be provided to extract material (e.g., fluids) from the formation 102 or to inject fluids through the string 104 into the formation 102 for the purpose of fracing.

As shown, the surface system 116 includes a pumping device 118 in fluid communication with a tank 120. In some embodiments, the pumping device 118 can be used to extract fluid, such as hydrocarbons, from the formation 102, and store the extracted fluid in the tank 120. In other embodiments, the pumping device 118 can be configured to inject fluid from the tank 120 into the string 104 to introduce fluid into the formation 102, for example, to stimulate and/or fracture the formation 102.

One or more flow rate and/or pressure sensors 122, as shown, are disposed in fluid communication with the pumping device 118 and the string 104 for measurement of fluid characteristics. The sensors 122 may be positioned at any suitable location, such as proximate to (e.g., at the discharge output) or within the pumping device 118, at or near a wellhead, or at any other location along the string 104 and/or within the borehole 106.

A processing and/or control unit 124 is disposed in operable communication with the sensors 122, the pumping device 118, and/or components of the downhole assembly 108. The processing and/or control unit 124 is configured to, for example, receive, store, and/or transmit data generated from the sensors 122 and/or the pump 118, and includes processing components configured to analyze data from the pump 118 and the sensors 122, provide alerts to the pump 118 or other control unit and/or control operational parameters, and/or communicate with and/or control components of the downhole assembly 108. The processing and/or control unit 124 includes any number of suitable components, such as processors, memory, communication devices and power sources.

In the configurations of FIGS. 1A-1B, downhole components can include electronic modules or electronic devices that are used for various functions, including, but not limited to, control functions, monitoring functions, communication functions, etc. The electronics can be mounted within a cavity of the downhole system. For example, different sections of tubing, piping, bottomhole assemblies, and/or other downhole structures (e.g., housings, casings, support structures, frames, probe sections, etc.), hereinafter referred to collectively as a "housing." The mounting may be required to secure the electronics within the housing.

A challenge in multistage horizontal completion is earth formation heterogeneity. In such completions, a lateral wellbore is typically divided into several dozen of frac-stages to ensure fracture coverage of the entire interval (e.g., length of the lateral wellbore). Limited entry perforation technics is used for stage and perforation spacing. In some configuration, this process can employ maximum injection rates of two barrels per minute per perforation hole. Such injection rates may limit the stage length and number of clusters. To enable improved injection and fracturing of the formation, formation evaluation tools may be employed (downhole and at the surface).

To improve horizontal well fracturing, super-stages may be employed wherein optimized injection can be performed within a single stage that replaces multiple stages in prior configurations. To enable such optimized super-stages, formation evaluation should also be improved. As used herein, a super-stage is a single fracing stage that is configured to perform multiple (different) injection operations at different locations within the stage. In contrast, traditional frac-stages, each stage is configured to a specific injection rate (e.g., high rates to frac ductile sections of formation and lower rates to frac brittle sections of formation). Further, in traditional frac operations, a fracing section of a string can include alternating frac-stages (e.g., alternating brittle fracing and ductile fracing). Although such alternating frac-stages has provided improved production results, the number of stages is increased, and thus costs and operations may have increased costs. Furthermore, such alternating stages may not actually be located relative to an appropriate section of the formation, and thus production efficiencies may not be optimized. Accordingly, the super-stages as described herein enable fewer stages and optimized injection. To enable the optimization and thus improve use of super-stages, formation evaluation is performed.

However, most formation evaluation tools designed to evaluate lateral sections of wells can be very expensive to configure and deploy. For example, wellbore intervention may be required to deploy formation evaluation tools downhole. Further, a challenge is presented within unconventional shales (e.g., mudrocks), unlike porous sandstone and carbonate reservoirs. Such challenge arises from the unconventional shale nano-Darcy permeability ranges and anisotropy of the mechanical and hydraulic properties of such formations. Most porosity-dependent logs are not sensitive enough to capture the true producibility characteristics of the unconventional shales. Another challenge is that the cohesion, bond strength, or presence of cracks and fracture in the formation types are lost in drill-cuttings.

However, an evidence of rate of penetration may give an insight of strength behavior. Mineralogy of drill cuttings could be used as an upper and lower bound inherent strength, hardness, and stiffness to characterize producibility and/or fracability which would assist in completion and stimulation program design, including for subsequent fracturing operations. Drill cuttings are readily available at the surface as a result of drilling operations (e.g., pumping and extraction) and thus may provide inexpensive and low-risk opportunities for formation evaluation. That is, formation evaluation may be achieved through analysis of drilling cuttings during the drilling operation. Such analysis may be performed to, at a minimum, determine geomechanical properties of the formation (e.g., elasticity (ductility and/or brittleness)).

Properties from mineralogy can be leveraged in a qualitative design process. Consequently, success in achieving optimized stimulation along the entire zone is not guaranteed. Super-stages derived through quantitative design principles, leveraging drill cuttings analysis, and advanced logs can reduce frac operation cost, increase predictability of outcomes, and improve well economics. In one example, the design and customization of temporary particle, liquid, and mechanical and/or chemical diverters (e.g., limited entry techniques) can be utilized for each individual stimulation point within a super-stage to ensure uniform cluster stimulation.

As provided herein, application of rock mechanical properties derived from drill cuttings analysis, borehole image resistivity, and acoustic logging enables optimized and/or combined frac stages into "super-stages." In some testing, such super-stages can help to reduce stimulation time and improve operation efficiency. The super-stages, relative to a formation, can consist of sections of alike or different rock properties depending on diversion and completion strategy used. For example, by employing estimates of breakdown pressure, the size, number, and orientation of perforations can be designed and optimized for each individual stimulation zone within the super-stage.

Figure 2:
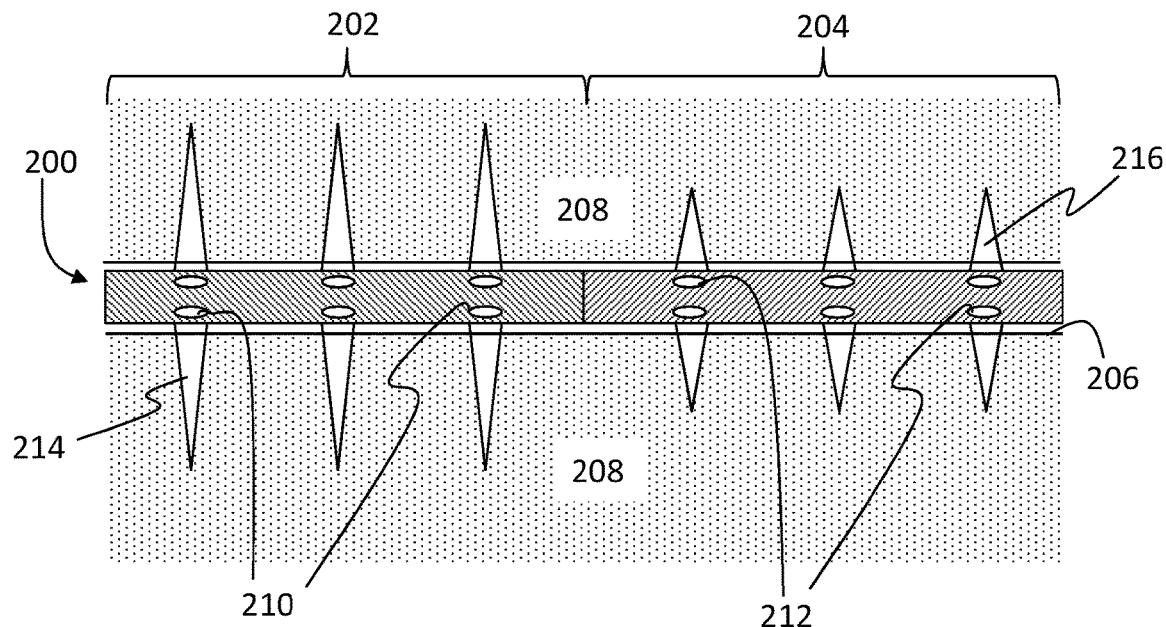
FIG. 2 is a schematic illustration of a fracing assembly having two separate frac-stages.

Turning to FIG. 2, a schematic illustration of a staged horizontal well is shown. As shown, a fracing assembly 200 includes a first frac-stage 202 and a second frac-stage 204. The fracing assembly 200 can include multiple frac-stages, e.g., more than just the first frac-stage 202 and the second frac-stage 204. The fracing assembly 200 is disposed in a borehole 206 that has been drilled within a formation 208. Each of the first and second frac-stages 202, 204 is a downhole component or tool that is part of the fracing assembly 200. Each of the frac-stages 202, 204 is fluidly connected to receive injection fluid (e.g., proppant) from the surface and inject said injection fluid into the formation 208 to fracture the formation. Each fracing-stage 202, 204 is specifically configured to provide a specific injection rate through one or more injection ports 210, 212, respectively. The injection ports 210, 212 inject injection fluid at differing rates, schematically illustrated as triangular injection rates 214, 216, respectively. As shown, the injection rate 210 injected from the injection ports 210 of the first frac-stage 202 is "larger" than the injection rate 212 injected from the injection ports 212 of the second frac-stage 204. The higher injection rate 210 can be used with the intent to fracture ductile sections of the formation 208 and the lower injection rate 212 can be used with the intent to fracture brittle sections of the formation 208. However, without knowing the composition and geomechanical properties of the formation 208, the injection rates 210, 212 may not be optimized for the specific portion of the formation 208 that is proximate or adjacent the first frac-stage 202 and the second frac-stage 204, respectively.

During operation, an injection fluid is pumped downhole and to the first and second frac-stages 202, 204. Each of the frac-stages 202, 204 then injects the injection fluid into the formation 208, as shown. However, because each frac-stage is specifically configured to a particular injection rate, even if the respective section of formation fractures (e.g., a brittle section of formation), the frac-stage will continue to inject injection fluid, which may be inefficient. Further, for sections that require additional injection fluid and/or higher flow rates (e.g., ductile sections of formation), the flow rates may not be sufficient due to the reduction in fluid that is diverted or used in other frac-stages (e.g., injected through injection ports of other frac-stages) and/or the particular frac-stage is not sufficient to enable fracturing of the ductile formation section.

Figure 3:
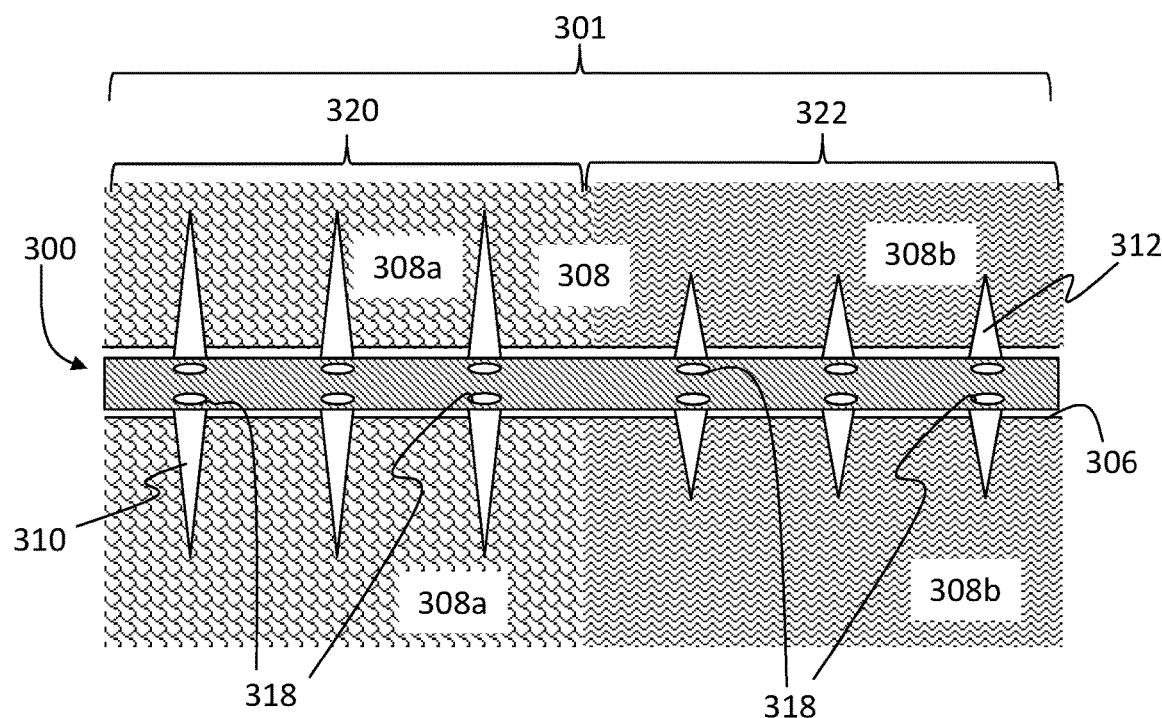
FIG. 3 is a schematic illustration of a super-stage fracing assembly in accordance with an embodiment of the present disclosure.

Turning now to FIG. 3, a frac assembly 300 in accordance with an embodiment of the present disclosure is shown having a single super-stage 301. As illustratively shown, in comparison to FIG. 2, the super-stage 301 is the same horizontal length as the first and second frac-stages of the frac assembly 200. The frac assembly 300 is disposed within a borehole 306 that has been drilled through a formation 308. The frac assembly 300 can include multiple super-stages similar to the super-stage 301 that each fluidly connects and to fluidly connect to the surface where injection fluid can be pumped into the formation 308.

In contrast to the separate frac-stages 202, 204 shown in FIG. 2, the super-stage 301 of FIG. 3 is a single (e.g., large or long) stage having multiple injection ports 318 along the length thereof. Each injection port 318 is fluidly connected to the same internal fluid path that connects to the surface to receive injection fluid. The super-stage 301 can be pre-configured prior to running into the borehole 306 to be customized based on downhole formation information. For example, in accordance with embodiments of the present disclosure, geomechanical properties of the formation 308 can be determined from data collected during the drilling operation. The geomechanical properties can include elastic properties (e.g., brittleness and/or ductility), horizontal stress, or other properties of the formation 308. As shown schematically in FIG. 3, the formation 308 includes a ductile section 308a and a brittle portion 308b, as determined in accordance with the present disclosure. Based on the determination of the geomechanical properties, the super-stage 301 is configured to inject fluid at a fast rate (from some or all injection ports 318) until the brittle portion 308b is fractured (rates indicated at 310, 312). The indication of fracturing of the brittle portion 308b can be determined by monitoring the return flow of the injection fluid and other material (e.g., surface treatment monitoring).

Once it is determined that the brittle portion 308b has fractured, diverters can be activated within the super-stage 301. By activating the diverters, the super-stage 301 is divided into an open section 320 and a closed section 322.

The open section 320 (and the injection ports 318 thereof) will receive all injection fluid and no injection fluid will be injected from the injection ports 318 of the closed section 322. Accordingly, an increased amount of injection fluid can be injected through the injection ports 318 of the open section 320 enabling increased flow rates and/or pressure to aid in fracturing a higher ductile material of the ductile section 308. In some embodiments, initially all injection ports 318 of the super-stage 301 will inject fluid at the same rate and upon fracturing of the brittle portion 308b, the injection ports 318 aligned with the brittle portion 308b will be closed (e.g., a diverted will be activated) and all fluid within the super-stage 301 will be directed through the injection ports 318 along the open section 320. That is, all sections of the formation 308 are stimulated until the brittle portion 308b breaks, and then diverters are activated to direct all injection fluid to the ductile portion 308a.

The super-stages as provided herein are enabled because it was observed that fracture breakdown and propagation pressures are lower for relatively higher "brittle" zones than fracture breakdown and propagation pressure of lower brittleness indices. For example, a brittle zone may have a Brittleness Index ("BI") of 70 ("BI 70") and a ductile zone may have a brittleness of BI 30. Accordingly, surface treating pressures are lower for the relatively higher "brittle" zones than zones with relatively lower brittleness indices. Surface treating pressure for the brittle zones is typically less than for the ductile rock. The difference in the surface treating pressure is likely due to increased near-wellbore friction in lower brittleness zones. Data suggests stages with relatively higher brittleness achieve target pumping rates twice as fast as those stages in the lower brittleness zones, even though fracture gradients are higher in higher brittleness zones. This suggests that reduction in fracture flow restriction due to near-wellbore friction in the brittle zones occurs faster. The finding above suggests that formation geomechanical properties and stresses play a key role in hydraulic fracture initiation and propagation. Brittleness Index may thus serve as a relative indicator of ease of fracturing. Geomechanical properties of the formation (e.g., stiffness, brittleness, unconfined compressive strength, minimum horizontal stress, etc.) and stresses can be used to combine frac-stages into super-stages to improve stimulation efficiency without affecting productivity.

The diverters employed within super-stages in accordance with embodiments of the present disclosure may be mechanical and/or chemical diverters (e.g., actuated valves, drop balls, or other types of fluid diverters as known in the art). For example, in one non-limiting example, once it is determined that a brittle zone of the formation has been fractured, one or more drop balls may be conveyed from the surface down to a position within the super-stage such that the drop ball diverts fluid around the closed section and to the open section of the super-stage.

Further, although described above with the diverters deployed after fracturing of a first formation section, alternative operations are possible without departing from the scope of the present disclosure. For example, a super-stage can be deployed within a borehole with a dissolvable diverter already present within the super-stage. The diverter can prevent injection fluid from entering a closed section of the super-stage. Once the formation is fractured, the diverter can be dissolved to enable formation fluid to enter the wellbore.

Further, although described above as employing a super-stage for a section of formation along a horizontal well having different geomechanical properties, super-stages are not so limited. For example, super-stages as described herein may be used for diversion and completion strategies that may require customized injection and/or fracturing of a formation.

As described above, the super-stages of the present disclosure can be customized based on the geomechanical properties of the formation. Such information and data sets may be obtained through analyzing drilling cuttings that return to the surface during a drilling operation. Subsurface geomechanical attribute data sets may be obtained through advanced interpretation approaches of drill bit developed rock cuttings, drilling response data, and mud derived hydrocarbon gases obtained using surface logging services. The drilling, cuttings, and gas data sets can be incorporated to understand "fracability" properties that help improve the design of stimulations and completions programs of unconventional horizontal lateral wells.

Accordingly, in accordance with some embodiments of the present disclosure, a data processing technique applied to surface logging data sets is provided. The techniques include application of derived mineralogy towards rock geomechanical properties for a rapid estimation of elastic parameters of a formation and/or section thereof. Geomechanical properties may include, but are not limited to, Young's modulus, Poisson's ratio, fracture toughness brittleness, tensile strength, hardness, and proppant embedment. These properties can be calibrated with other log based or lad test results, if any. In some embodiments, the geomechanical properties can be considered with other information, including but not limited to, fluid sampler-derived attributes to provide an improved design basis for subsequent completion and stimulation operations including hydraulic fracturing.

As noted above, embodiments of the present disclosure employ mineralogy measurements from drill cuttings samples to enable customized super-stages to be deployed for efficient fracing operations. During a drilling operation, drill cuttings are collected by interval (e.g., available depth interval spacing) and various mineralogy tests and measurements are performed on the drill cuttings such that each interval can be characterized. For example, using known mineralogical information (e.g., mineral-matrix bulk and shear modulus) with an application of Voigt and Reuss averaging algorithms as an upper and lower bounds, respectively, an accurate representation and understanding of the geology and composition of the interval can be determined. An average of the bounds provided from the averaging algorithms can provide a representative value for the respective parameters (e.g., bulk and shear modulus). Further, based on isotropic conditions, Young's modulus and Poison's ratio can be calculated, as described herein.

Figure 4:
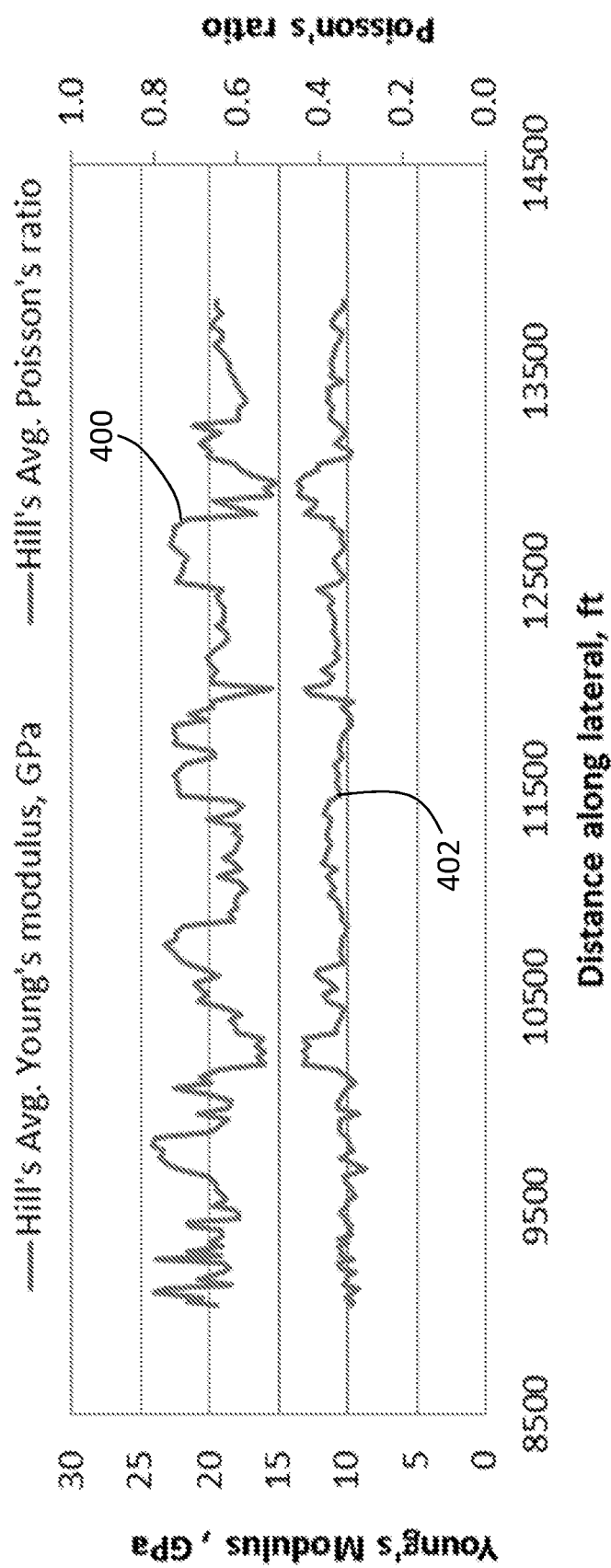
FIG. 4 is a schematic plot of outputs for Young's Modulus and Poisson's ratio for a horizontal length of a formation obtained in accordance with an embodiment of the present disclosure.

A representative output employing the above calculations is shown in FIG. 4 as a schematic plot. In FIG. 4, the horizontal axis is a distance along the lateral of a wellbore in feet; the left-hand vertical axis is Young's Modulus in GPa and the right-hand vertical axis is Poisson's ratio. Plotted on the graph of FIG. 4 is curve 400 which is an example plot of Hill's Average Young's Modulus of the earth formation along the length of the lateral wellbore and defines an upper bound. Also shown, curve 402 is an example plot of Hill's Average Poisson's ratio of the earth formation along the length of the lateral wellbore and defines a lower bound.

Subsequently, based on Young's modulus of elasticity, unconfined compressive strength and fracture toughness can also be estimated, as will be appreciated by those of skill in the art. Further, Young's modulus can be used to complement minimum horizontal pressure, hardness, and proppant embedment obtained from acoustic log(s), if any.

Figure 5:
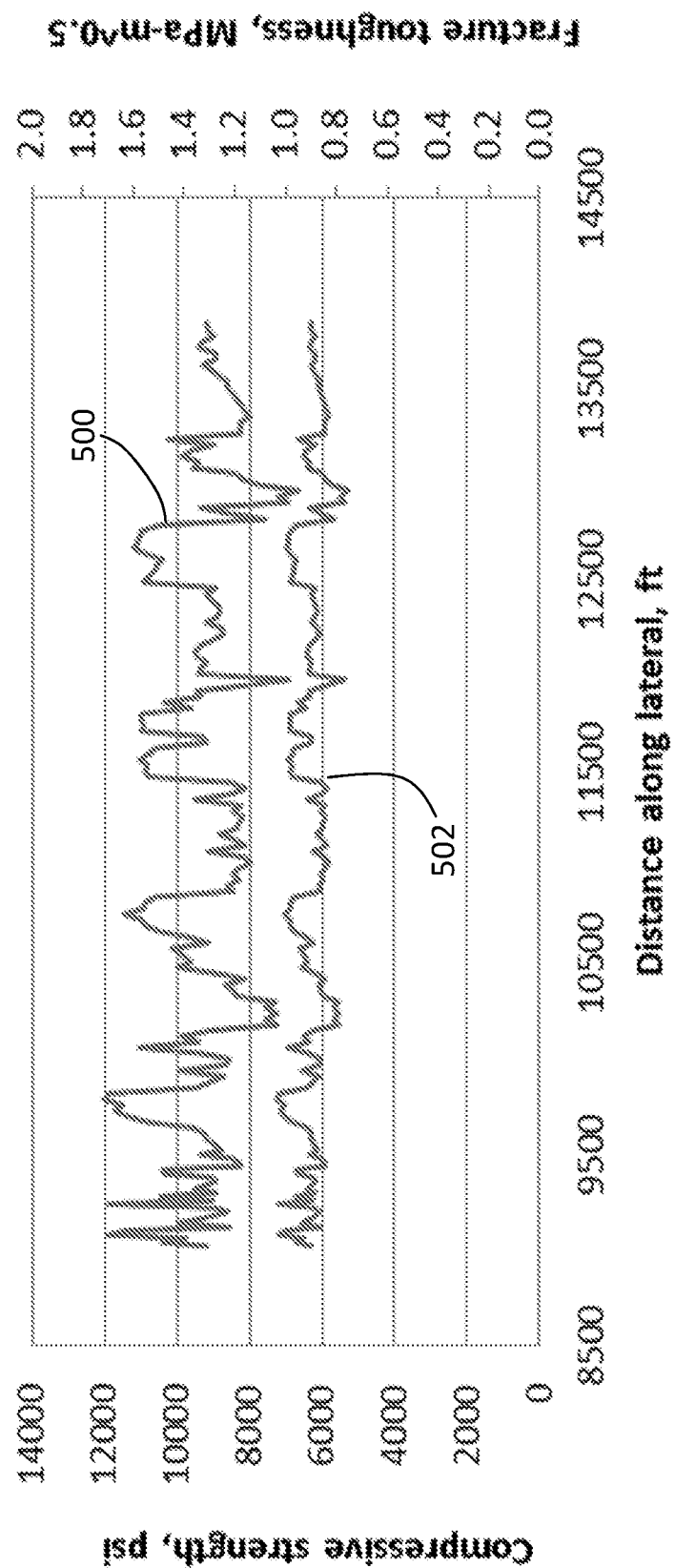
FIG. 5 is a schematic plot of compressive strength and fracture toughness of the same horizontal length of formation shown in FIG. 4.

For example, FIG. 5 illustrates a schematic plot showing the same horizontal axis as that shown in FIG. 4 (i.e., same lateral wellbore), with compressive strength in psi on the left-hand vertical axis and fracture toughness in MPa-m$^{0.5}$. As shown in FIG. 5, a curve 500 represents the compressive strength along the lateral wellbore as obtained from Lewis L. Lacy, 1997, *Dynamic Rock Mechanics Testing for Optimized Fracture Designs*, 1997 SPE Annual Technical Conference and Exhibition, San Antonio, Tex., Oct. 5-8, 2996, Society of Petroleum Engineers, Inc. Similarly, as shown in FIG. 5, a curve 502 represents the fracture toughness of the formation along the lateral wellbore as obtained from M. J. Iqbal, B. Mohanty, *Experimental Calibration of ISRM Suggested Fracture Toughness Measurement Techniques in Selected Brittle Rocks*, Rock Mechanics and Rock Engineering, 2007. Although specific sources are employed for the plot generated in FIG. 5, those of skill in the art will appreciate that other sources and references may be used without departing from the scope of the present disclosure.

Figure 6:
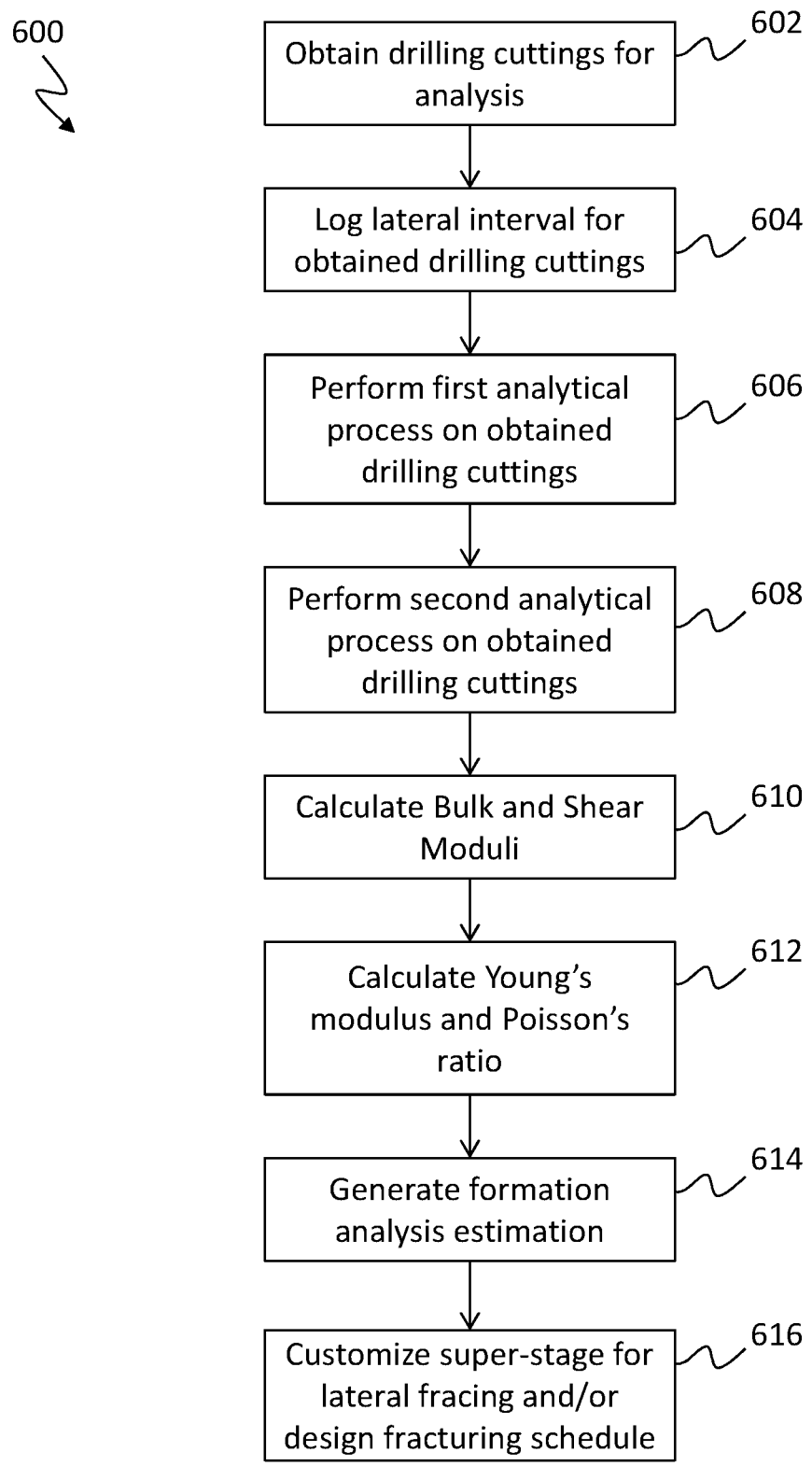
FIG. 6 is a flow process for optimizing a super-stage and/or designing a fracturing schedule in accordance with a non-limiting embodiment of the present disclosure.

Turning now to FIG. 6, a flow process 600 representing a non-limiting process for optimizing a super-stage and/or designing a fracturing schedule in accordance with the present disclosure is shown. The flow process 600 can be employed to generate a plot such as that shown in FIG. 4, and enables generation of the plot shown in FIG. 5.

At block 602, drilling cuttings are obtained during a drilling operation for form a horizontal portion of a wellbore. Obtaining drilling cuttings for analysis as described herein is readily known, and thus such techniques will not be described in detail. The drilling cuttings may be obtained in sample units that are selected as representative of an interval of the horizontal drilling operation. Thus, the sample units of drilling cuttings can be collected at predetermined times, lengths, positions, etc. Further, multiple sample units can be obtained for a single interval of the lateral wellbore.

At block 604, the sample units of the drilling cuttings are logged or otherwise identified as part of a specific lateral interval. That is, the sample units of the drilling cuttings are mapped to a position along the lateral extent of the wellbore such that analysis performed with respect to the sample unit of drilling cuttings will be identifiable and trackable such that an estimate of geological and/or geomechanical properties of the formation can be positionally and/or spatially identified.

At block 606, a first analysis is performed on the sample unit of drilling cuttings. The first analysis may be one or more analytical processes that test and/or measure characteristics of the sample unit of drilling cuttings. For example, the first analytical process may be performing X-ray diffraction on the sample unit of drilling cuttings. In some embodiments, the X-ray diffraction may be X-ray powder diffraction. In another example, the first analytical process may be performing X-ray fluorescence on the sample unit of drilling cuttings. Further, in some embodiments, a combination of tests and/or analytical processes may be performed in the first analysis. Additionally, additional types of analytical process may be used beyond those described herein, without departing from the scope of the present disclosure.

At block 608, a second analysis is performed on the obtained drilling cuttings. The second analysis may be one or more mineral analysis of the sample unit of drilling cuttings. For example, a mineral weight percent may be measured for the sample unit using techniques and processes as known in the art. In other embodiments, additional and/or different types of analysis may be performed on the drilling cuttings.

In some embodiments, block 606 and block 608 may be combined into a single analysis step which includes one or more analytical processes and procedures to obtain geological, geomechanical, and/or geophysical properties of the obtained drilling cuttings. Similarly, additional and/or different analytical processes may be incorporated into blocks 606, 608 (or the combination thereof). That is, although describe above as a two-step process, the analytical aspect of flow process 600 may include any number of techniques, methods, processes, etc. as known in the art, to obtain geological, geomechanical, and/or geophysical properties of the sample unit of the drilling cuttings.

At block 610, bulk modulus and shear modulus are calculated from the information and data obtained at blocks 606, 608. The calculation of the moduli in block 610 may be obtained from known sources, such as, but not limited to, G. Mavko, T. Mukerji, and J. Dvorkin, *The Rock Physics Handbook*, Cambridge University Press, 2009, pages 458-461. Although a particular source is provided herein, those of skill in the art will appreciate that various and alternative sources may be referenced to obtain the moduli in block 610. Further, in some embodiments, the moduli may be mathematically and/or analytically obtained using known processes.

At block 612, Young's Modulus and Poisson's ratio are obtained from the moduli obtained at block 610. For example, using the same reference above (Mavko et al.), Young's Modulus and Poisson's ratio may be obtained for an isotropic solution. (Id., page 23). Again, although a specific reference is referred to herein, those of skill in the art will appreciate that alternative and/or additional methods may be used to obtaining Young's Modulus and Poisson's ratio for the drilling cuttings sample unit. In an alternative configuration, at block 612, Young's modulus could be calibrated and used based on acoustic logs and/or lab tests that may be available for the given system.

At block 614, using the information and data obtained in blocks 604-612, a formation analysis estimation is generated for the interval identified at block 604. The formation analysis estimation, in some embodiments, is a mapping of geomechanical properties of the downhole formation along the lateral wellbore with respect to position. That is, for example, elastic properties (e.g., brittleness, ductility) of the formation may be mapped with respect to position. From the above analysis, brittleness/ductility may be obtained for the interval. For example, if a sample unit of the drilling cuttings has a high Young's modulus and a low Poisson's ratio, the interval (or portion thereof) is brittle, and if Young's modulus is high low and Poisson's ratio is high, the interval (or portion thereof) is ductile.

At block 616, using the formation analysis estimation, one or more super-stages may be customized and/or optimized for deployment to the interval to achieve efficient and effective fracturing of the earth formation at the interval. Additionally, or in the alternative, at block 616, the formation analysis estimation may be used to design a fracturing schedule to be performed using the super-stage(s). The customization of the super-stage(s) can involve configuring a super-stage with one or more diverters such that injection fluid may be injected over the length of the super-stage in accordance with the fracturing schedule.

An example application of the flow process 600 will now be described. In this example, a horizontal wellbore interval is drilled using conventional means, and drilling cuttings from the drilling operation are collected and logged (blocks 602, 604). The analytical steps (blocks 606-608) are performed to identify the drilling cuttings as having Quartz, Kaolonite, and Calcite. From this analysis, Bulk and Shear moduli for these minerals are obtained (block 610). For example, Quartz has a bulk modulus of 37 GPa and a shear modulus of 44 GPa; Kaolinite has a bulk modulus of 1.5 GPa and a shear modulus of 1.4 GPa; and Calcite has a bulk modulus of 76.8 GPa and a shear modulus of 32 GPa.

From the above obtained moduli, an upper bound (Voigt average) bulk modulus for the mineral composition is: 0.40*37+0.4*1.5+0.2*76.8=30.76 GPa. A lower bound (Reuss average) bulk modulus is:

$$\frac{1}{\left(\frac{0.40}{37}+\frac{0.4}{1.5}+\frac{0.2}{76.8}\right)} = 3.57 \text{ GPa}.$$

Employing the shear modulus, an upper bound shear module (Voigt average) is: 0.04*44+0.4*1.4*0.2*32=24.56 GPa. Similarly, a lower bound (Reuss average) shear modulus is:

$$\frac{1}{\left(\frac{0.40}{44}+\frac{0.4}{1.4}+\frac{0.2}{32}\right)} = 3.32 \text{ GPa}.$$

From the above, an average of upper and lower bound of the bulk moduli, i.e., a Hill average of the bulk modulus is: K=17.17 GPa. Similarly, an average of upper and lower bound of the shear moduli, i.e., a Hill average of the shear modulus is: $\mu$=13.94 GPa. Next, an average Young's modulus for the interval is obtained:

$$\frac{(9K\mu)}{(3K+\mu)} = 32.9 \text{ GPa}.$$

Similarly, an average Poisson's ratio for the interval is obtained:

$$\frac{(3K-2\mu)}{2(3K+\mu)} = 0.18.$$

As noted above, brittle facies are high Young's modulus and low Poisson's ratio and ductile facies are low Young's modulus and high Poisson's ratio. Accordingly, the interval may be identified as brittle or ductile. For example, in some non-limiting embodiments, less than 50 (arbitrary units) may be ductile and more than 50 is brittle. In another, non-limiting example, a ductile medium and may have an average of 0.3 for brittleness, the brittle section may be something that has a value for brittleness index 0.35, the medium is still ductile but may be a portion of the zone that has a little bit more high index so should be a little bit more brittle. Those of skill in the art will appreciate that these values may be different or involve various considerations based on the conditions, geological features, etc., and thus the examples are not to be limiting.

Although described above with respect to using Young's modulus and Poisson's ratio for identifying brittle and ductile intervals from analysis of drilling cuttings, other methods are contemplated in accordance with embodiments of the present disclosure. For example, in another embodiment, minimum horizontal stress may be used for super-stage hydraulic fracture completion design (e.g., super-stage configuration and/or fracturing schedule). Such alternative process may be used for sections that have similar ductility/brittleness but different minimum horizontal stresses. For example, in a section of horizontal borehole that has been identified as having ductile properties (e.g., similar geomechanical properties with respect to brittleness) that spans three intervals (e.g., interval 1, interval 2, interval 3), each of the intervals can be analyzed for further differences in an additional geomechanical property. In such example, each interval may be analyzed with respect to the minimum horizontal stress of the interval. The minimum horizontal stress for intervals within a horizontal wellbore may be obtained using drilling cuttings analysis, wireline logging while drilling logs, as will be appreciated by those of skill in art.

In this example, it may be determined that intervals 1 and 3 have low minimum horizontal stress and interval 2 has high minimum horizontal stress. Based on this, one or more super-stages can be designed and configured to perform a fracturing schedule to efficiently fracture all of the intervals. For example, intervals having high minimum horizontal stress experience higher breakdown and surface treating pressure as compared to intervals having low minimum horizontal stress and similar brittleness (i.e., ductile/brittle rock properties).

In this example, (using example lengths) interval 2 being 342 feet in length and interval 3 being 303 feet in length can be combined in one super-stage of 645 feet total length even though the super-stage spans intervals located in different (high and low) minimum horizontal stress. In this example, the super-stage will be arranged with diverters to enable selective or pre-determined fracing such that interval 1 will be fraced first because of the low minimum horizontal stress. After completing the frac schedule for interval 1, one or more chemical and/or mechanical diverters can be used to temporarily block the portion of the super-stage aligned with interval 1. Once the diverters are engaged and/or actuated, fracing of interval 2 can be started without stopping fracturing operations. The high stress contrast in minimum horizontal stress between interval 1 and interval 2 will insure sequence fracturing such that interval 1 is fraced first and interval 2 is subsequently fraced. The difference in minimum horizontal stress (measured in PSI) between intervals that span super-stage completion design are calculated based on anticipated pumping rate and number of perforations.

In accordance with the present disclosure, and as described above, developing capital efficient technology solutions for the petroleum industry is fundamental in delivering economically challenging unconventional hydrocarbon resources. One such economical solution for subsurface identification of producibility, fracability, and geohazards includes mineralogical, hydrocarbon, and geomechanical attribute data sets derived from drilling cuttings, drilling response data, and hydrocarbon gases through surface logging services. The drilling cuttings and gas data sets can be incorporated to understand producibility, fracability, and geohazard properties that can be used to help improve design of stimulation and completion programs for custom super-stage and cluster selection within a horizontal lateral wellbore.

As noted above, one option for obtaining geomechanical properties is the application of derived mineralogy toward rock geomechanical attributes for the rapid estimation of key elastic parameters. Such geomechanical properties include, but are not limited to, Young's modulus, Poisson's ratio, fracture toughness, brittleness, embedment strength, and hardness. The obtained geomechanical properties, together with instantaneous shut-in pressure, at each interval of a lateral wellbore can provide calibration for stresses and subsequent hydraulic fracture stage treatment selection (i.e., customization of super-stages and fracturing schedules).

As discussed above, the challenge within unconventional shales (e.g., mudrocks), unlike porous sandstone and carbonate reservoirs, is from nano-Darcy permeability ranges of the material and anisotropy of mechanical and hydraulic properties. Most conventional and/or traditional porosity-dependent logs are not sensitive enough to capture true producibility characteristics of the unconventional shales. The other challenge is that cohesion, bond strength, and/or the presence of cracks and fracture in the formation are lost in drill-cuttings. However, evidence of rate of penetration may give an insight of strength behavior. Surface logging system derived data sets, often ignored and not valued, can contribute significantly through the application of advanced equipment of mineralogy identification. Such mineralogy identification can include X-ray diffraction, X-ray fluorescence, total organic carbon indicators, hydrocarbons, hydrocarbon phase, fracture indicators, and geohazards. Advanced techniques to develop geomechanical properties from mineralogy, avoidance of ductile, high stress and high embedment zone are provided as described above. An offset experience on instantaneous shut in pressure and breakdown pressure indicators could be used as calibration.

An alternative process (and or additionally) may include using conventional techniques. By employing and/or combining a plurality of techniques, geomechanical properties may be obtained. Such conventional techniques may include quad-combo, deep shear wave imaging, borehole imaging, pressure testing, microfrac testing, mineralogy logs, and/or core testing.

In various embodiments of the present disclosure, drilling cuttings analysis as a "mud-log" is employed. However, embodiments described herein advance traditional mud-logs by adding understanding in the process. The collected information, as described above, can be validated by gamma ray or other logs (if available) and add significant value to enable super-stages as described herein. As described above, mineralogy measurements from drilling cuttings sample units (e.g., collected intervals at depth interval spacing) are analyzed for bulk and shear modulus with an application of the Voigt and Reuses averaging algorithms as an upper and lower bounds, respectively. An average of these bounds provides a representative value for these parameters. Further, based on isotropic conditions, Young's modulus and Poisson's ratio can be calculated. It has been observed that a trend line for variation in Young's modulus and Poisson's ratio remain the same irrespective of the porosity content and/or individual mineralogy-by-weight fractions. Accordingly, once the magnitude of elastic properties is calibrated by acoustic logs of compressional (P-wave), Shear (S-wave) and density, and/or core testing for elastic properties in the laboratory, these can be used to calculate brittleness, fracture toughness, and Brinell hardness. These geomechanical properties can then be employed for hydraulic fracturing scheduling and optimization thereof by avoiding ductile zones, high stress zones and/or zones causing increased embedment on proponents and/or customized fluid injection rates to account for such zones.

Embodiment 1

Methods for optimizing a fracturing schedule for fracturing formations located along a horizontal wellbore, the methods comprising: obtaining drilling cuttings during a drilling operation representative of a predetermined interval of the horizontal wellbore; performing at least one analytical process on the obtained drilling cuttings to determine at least one geomechanical property of the interval of the obtained drilling cuttings for the interval; generating a formation analysis estimation for the interval from the, wherein the formation analysis estimation comprises at least one of (i) a brittleness of the formation at the interval or (ii) a minimum horizontal stress of the formation at the interval; and based on the formation analysis estimation, at least one of (i) configuring a super-stage for deployment to the interval to perform a fracturing operation or (ii) designing a fracturing schedule to be performed to frac the formation at the interval.

Embodiment 2

The method of any of the embodiments described herein, wherein the at least one geomechanical property of the interval comprises a bulk modulus and a shear modulus of the interval.

Embodiment 3

The method of any of the embodiments described herein, further comprising calculating Young's Modulus and Poisson's ratio from the bulk modulus and the shear modulus of the interval.

Embodiment 4

The method of any of the embodiments described herein, wherein the formation analysis estimation for the interval is based on the calculated Young's Modulus and Poisson's ratio.

Embodiment 5

The method of any of the embodiments described herein, wherein the super-stage is a fracing-stage that is configured to perform multiple facing operations at different locations along the fracing-stage.

Embodiment 6

The method of any of the embodiments described herein, further comprising actuating at least one diverter within the super-stage to close a portion of the super-stage and divert injection fluid to open portions of the super-stage.

Embodiment 7

The method of any of the embodiments described herein, wherein the at least one analytical process includes at least one of X-ray diffraction, X-ray fluorescence, or mineral-weight-percent calculations.

Embodiment 8

The method of any of the embodiments described herein, wherein indication of a brittle portion of the interval is provided by a high Young's Modulus and low Poisson's ratio and a ductile portion of the interval is provided by a low Young's Modulus and high Poisson's ratio.

Embodiment 9

The method of any of the embodiments described herein, wherein configuring the super-stage or designing the fracturing schedule comprises having a brittle portion of the interval fraced prior to having a ductile portion of the interval.

Embodiment 10

The method of any of the embodiments described herein, further comprising: performing surface treatment monitoring to determine that a brittle portion of the interval has fractured; and after determining the brittle portion has fractured, actuating a diverter within the super-stage to stop injection of fluids from the super-stage at the brittle portion of the interval.

Embodiment 11

The method of any of the embodiments described herein, further comprising determining at least one additional formation analysis estimation for at least one additional interval of the horizontal wellbore.

Embodiment 12

The method of any of the embodiments described herein, further comprising: disposing the super-stage within the wellbore; and performing a fracing operation with the super-stage in accordance with the fracturing schedule.

Embodiment 13

Downhole tools for performing fracing operations in a downhole formation comprising: a super-stage having a plurality of injection ports located along a length thereof; and at least one diverter positioned within the super-stage, wherein when the at least one diverter is actuated, the super-stage is separated into an open section and a closed section such that injection fluid is not injected into the formation from injection ports of the closed section and all injection fluid is injected into the formation from the injection ports of the open section.

Embodiment 14

The downhole tool of any of the embodiments described herein, wherein the open and closed portions of the super stage are defined by: obtaining drilling cuttings during a drilling operation representative of a predetermined interval of the downhole formation along a horizontal wellbore; performing at least one analytical process on the obtained drilling cuttings to determine at least one geomechanical property of the interval of the obtained drilling cuttings for the interval; and generating a formation analysis estimation for the interval from the, wherein the formation analysis estimation comprises at least one of (i) a brittleness of the formation at the interval or (ii) a minimum horizontal stress of the formation at the interval, wherein the at least one diverter separates the super-stage such that brittle portions of the interval will be fractured prior to ductile portions of the interval.

Embodiment 15

The downhole tool of any of the embodiments described herein, wherein the at least one geomechanical property of the interval comprises a bulk modulus and a shear modulus of the interval and a Young's Modulus and Poisson's ratio are derived therefrom and the formation analysis estimation is based on the calculated Young's Modulus and Poisson's ratio.

Embodiment 16

The downhole tool of any of the embodiments described herein, wherein the at least one analytical process includes at least one of X-ray diffraction, X-ray fluorescence, or mineral-weight-percent calculations.

Embodiment 17

The downhole tool of any of the embodiments described herein, wherein the super-stage is configured to perform multiple facing operations at different locations along the super-stage based on actuation of the at least one diverter.

Embodiment 18

The downhole tool of any of the embodiments described herein, wherein the at least one diverter is actuated based on a surface treatment monitoring and a determination that a brittle portion of the interval has fractured.

Embodiment 19

The downhole tool of any of the embodiments described herein, further comprising at least one additional super-stage to be disposed at an additional interval of the wellbore.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for optimizing a fracturing schedule for fracturing a formation located along a deviated wellbore, the method comprising:
    obtaining drilling cuttings during a drilling operation representative of an interval of the deviated wellbore;
    logging the obtained drilling cuttings to map a plurality of positions along the deviated wellbore from which the obtained drilling cuttings are sourced during the drilling operation;
    performing at least one analytical process on the obtained drilling cuttings to determine at least one geomechanical property of the interval of the obtained drilling cuttings for the interval, wherein the at least one geomechanical property comprises one or more of stiffness, brittleness, unconfined compressive strength, and minimum horizontal stress, wherein the at least one analytical process includes X-ray diffraction mineral-weight-percent calculations;
    calculating at least one of Young's Modulus and Poisson's ratio from the at least one geomechanical property;
    generating a formation analysis estimation for the interval from the at least one geomechanical property to estimate a near-wellbore friction of the interval, wherein the formation analysis estimation includes determining brittleness and ductility of the interval based on the at least one of the calculated Young's Modulus and Poisson's ratio;
    mapping the formation analysis estimation along the interval to the plurality of positions; and
    based on the formation analysis estimation and the mapping, at least one of (i) configuring a super-stage for deployment to the interval to perform a fracturing operation or (ii) designing the fracturing schedule to be performed to frac the formation at the interval.

2. The method of claim 1, wherein the at least one geomechanical property of the interval comprises a bulk modulus and a shear modulus of the interval.

3. The method of claim 2, wherein calculating the at least one of the calculated Young's Modulus and Poisson's ratio is obtained from the bulk modulus and the shear modulus of the interval.

4. The method of claim 1, wherein the super-stage is a fracing-stage that is configured to perform multiple facing operations at different locations along the fracing-stage.

5. The method of claim 4, further comprising actuating at least one diverter within the super-stage to close a portion of the super-stage and divert injection fluid to open portions of the super-stage.

6. The method of claim 1, wherein the at least one analytical process further includes X-ray fluorescence calculations.

7. The method of claim 1, wherein indication of a brittle portion of the interval is provided by a high Young's Modulus and low Poisson's ratio and a ductile portion of the interval is provided by a low Young's Modulus and high Poisson's ratio.

8. The method of claim 7, wherein configuring the super-stage or designing the fracturing schedule comprises having the brittle portion of the interval fraced prior to having the ductile portion of the interval.

9. The method of claim 8, further comprising:
    performing surface treatment monitoring to determine that the brittle portion of the interval has fractured; and after determining the brittle portion has fractured, actuating a diverter within the super-stage to stop injection of fluids from the super-stage at the brittle portion of the interval.

10. The method of claim 1, further comprising determining at least one additional formation analysis estimation for at least one additional interval of the deviated wellbore.

11. The method of claim 1, further comprising:
disposing the super-stage within the deviated wellbore; and
performing a fracing operation with the super-stage in accordance with the fracturing schedule.

12. A downhole tool for performing a fracing operation in a downhole formation, the downhole tool comprising:
a super-stage having a plurality of injection ports located along a length thereof; and
at least one diverter positioned within the super-stage, wherein when the at least one diverter is actuated, the super-stage is separated into an open section and a closed section such that injection fluid is not injected into the downhole formation from the injection ports of the closed section and the injection fluid is injected into the downhole formation from the injection ports of the open section,
wherein the open and closed sections of the super-stage are defined by:
obtaining drilling cuttings during a drilling operation representative of an interval of the downhole formation along a deviated wellbore;
logging the obtained drilling cuttings to map a plurality of positions along the deviated wellbore from which the obtained drilling cuttings are sourced during the drilling operation;
performing at least one analytical process on the obtained drilling cuttings to determine at least one geomechanical property of the interval of the obtained drilling cuttings for the interval, wherein the at least one geomechanical property comprises one or more of stiffness, brittleness, unconfined compressive strength, and minimum horizontal stress, wherein the at least one analytical process includes X-ray diffraction mineral-weight-percent calculations;
calculating at least one of Young's Modulus and Poisson's ratio from the at least one geomechanical property;
generating a formation analysis estimation for the interval from the at least one geomechanical property to estimate a near-wellbore friction of the interval, wherein the formation analysis estimation includes determining brittleness and ductility of the interval from the at least one of the calculated Young's Modulus and Poisson's ratio; and
mapping the formation analysis estimation along the interval to the plurality of positions,
wherein the at least one diverter separates the super-stage such that a brittle portion of the interval will be fractured prior to ductile portions of the interval.

13. The downhole tool of claim 12, wherein the at least one geomechanical property of the interval comprises a bulk modulus and a shear modulus of the interval and the at least one of the calculated Young's Modulus and Poisson's ratio are derived therefrom and the formation analysis estimation is based on the at least one of the calculated Young's Modulus and Poisson's ratio.

14. The downhole tool of claim 12, wherein the at least one analytical process further includes X-ray fluorescence calculations.

15. The downhole tool of claim 12, wherein the super-stage is configured to perform multiple facing operations at different locations along the super-stage based on actuation of the at least one diverter.

16. The downhole tool of claim 12, wherein the at least one diverter is actuated based on a surface treatment monitoring and a determination that the brittle portion of the interval has fractured.

17. The downhole tool of claim 12, further comprising at least one additional super-stage to be disposed at an additional interval of the deviated wellbore.

* * * * *